United States Patent
Abbott et al.

(10) Patent No.: US 7,039,673 B1
(45) Date of Patent: May 2, 2006

(54) METHOD AND APPARATUS FOR DYNAMIC COMMAND EXTENSIBILITY IN AN INTELLIGENT AGENT

(75) Inventors: Aaron Abbott, Eagan, MN (US); Dale Schumacher, Eagan, MN (US); Brett Peterson, Eagan, MN (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/220,436

(22) Filed: Dec. 24, 1998

(51) Int. Cl.
*G06F 15/16* (2006.01)

(52) U.S. Cl. .......... 709/203; 709/220; 709/221; 709/222; 719/313; 719/314

(58) Field of Classification Search ........... 709/203, 709/220, 221, 222, 303, 304, 315
See application file for complete search history.

(56) References Cited

U.S. PATENT DOCUMENTS

| | | | | |
|---|---|---|---|---|
| 5,155,847 A | | 10/1992 | Kirouac et al. ........ 395/600 |
| 5,287,537 A | * | 2/1994 | Newmark et al. |
| 5,551,035 A | * | 8/1996 | Arnold et al. |
| 5,564,051 A | | 10/1996 | Halliwell et al. ........ 395/600 |
| 5,586,304 A | | 12/1996 | Stupek et al. ........ 395/712 |
| 5,701,484 A | * | 12/1997 | Artsy |
| 5,732,270 A | * | 3/1998 | Foody et al. |
| 5,758,351 A | * | 5/1998 | Gibson et al. |
| 5,764,992 A | | 6/1998 | Kullick et al. ........ 395/712 |
| 5,793,965 A | * | 8/1998 | Vanderbilt et al. ........ 709/203 |
| 5,805,804 A | * | 9/1998 | Laursen et al. |
| 5,812,533 A | * | 9/1998 | Cox et al. |
| 5,815,710 A | * | 9/1998 | Martin et al. |
| 5,832,219 A | * | 11/1998 | Pettus ........ 709/203 |
| 5,860,004 A | * | 1/1999 | Fowlow et al. |
| 5,913,037 A | * | 6/1999 | Spofford et al. |
| 5,920,725 A | * | 7/1999 | Ma et al. |
| 5,920,868 A | * | 7/1999 | Fowlow et al. |
| 5,923,850 A | * | 7/1999 | Barroux |
| 5,949,998 A | * | 9/1999 | Fowlow et al. |
| 5,956,506 A | * | 9/1999 | Cobb et al. |
| 5,968,116 A | * | 10/1999 | Day, II et al. |
| 5,969,967 A | * | 10/1999 | Aahlad et al. |
| 5,974,454 A | * | 10/1999 | Apfel et al. ........ 709/221 |
| 5,991,823 A | * | 11/1999 | Cavanaugh, III et al. ... 709/304 |
| 5,996,012 A | * | 11/1999 | Larriel |
| 5,999,940 A | * | 12/1999 | Ranger |
| 6,006,251 A | * | 12/1999 | Toyouchi et al. ........ 709/203 |
| 6,009,467 A | * | 12/1999 | Ratcliff et al. |
| 6,012,152 A | * | 1/2000 | Douik et al. |
| 6,029,175 A | * | 2/2000 | Chow et al. |

(Continued)

FOREIGN PATENT DOCUMENTS

EP     0 817 046 A2    1/1998

OTHER PUBLICATIONS

"Seeking the Holy Grail of Web-Based Business Intelligence" by Wayne D. Eckerson www.brio.com/library/hg2.html.

(Continued)

*Primary Examiner*—Andrew Caldwell
*Assistant Examiner*—Stephan Willett
(74) *Attorney, Agent, or Firm*—Pillsbury Winthrop Shaw Pittman LLP

(57) ABSTRACT

A system is provided whereby software components acting as servers can be upgraded or installed when new functionality is required without client components which have made requests to these components being made aware of the upgrade initiated by their request. The servers can then respond to requests which would otherwise have caused errors in the client components.

10 Claims, 3 Drawing Sheets

U.S. PATENT DOCUMENTS

| | | | | |
|---|---|---|---|---|
| 6,108,712 | A | * | 8/2000 | Hayes, Jr. |
| 6,182,136 | B1 | * | 1/2001 | Ramanathan et al. |
| 6,202,207 | B1 | * | 3/2001 | Donohue |
| 6,216,212 | B1 | * | 4/2001 | Challenger et al. |
| 6,314,565 | B1 | * | 11/2001 | Kenner et al. ............. 709/221 |
| 6,336,138 | B1 | * | 1/2002 | Caswell et al. |

OTHER PUBLICATIONS

"Programming in Lua/P" by Stephan Herrman swt.cs.tu.berlin.de/-stephan/pirol/LauP/programming.html.

"Knowledge Lab Products" Author Unknown www.krdl.org.sg/RND/knowledge/projects/index.html.

"Plug In Your Browser for More Power" by Josh Linder www.apnpc.com.au/intranet/issues/1996/plugin.html.

"Agents: Not Just for Bond Anymore" by Bret Sommers www.javaworld.com/javaworld/jw-04-1997/jw-04-agents.html.

Lewandowski, Scott M., "*Frameworks for Component-Based Client/Server Computing,*"Department of Computer Science, Brown University, *ACM Computing Surveys,*vol. 30, No. 1, Mar. 1998, pp. 3-27.

Orfali, Robert, et al., *Client/Server Programming with JAVA and CORBA,*ISBN 0-471-16351-1, copyright 1997 by John Wiley & Sons, Inc., pp. 1-57.

Communication (1 page) and Supplementary European Search Report (2 pages), EP 99 96 7576, mailed Jun. 16, 2004.

* cited by examiner

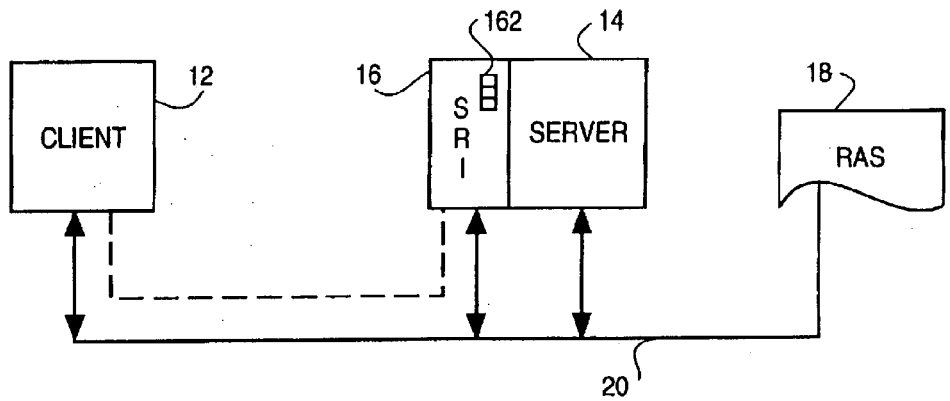
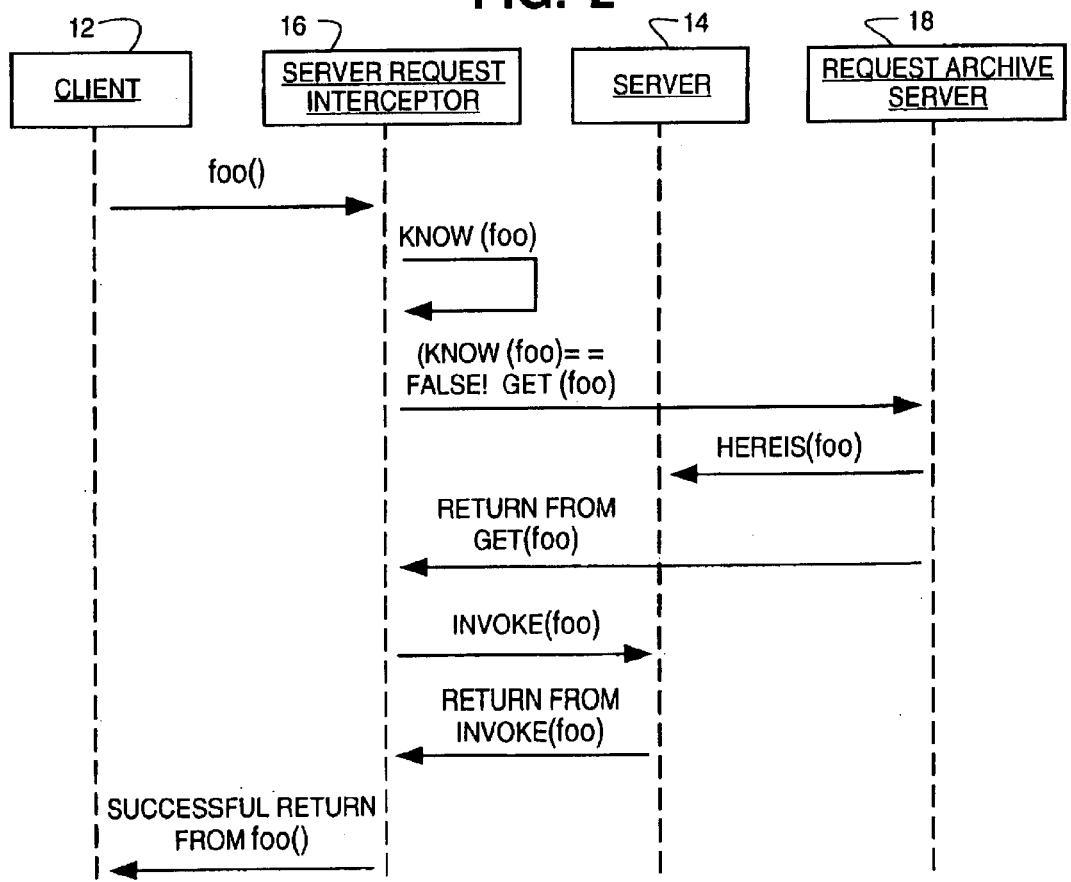

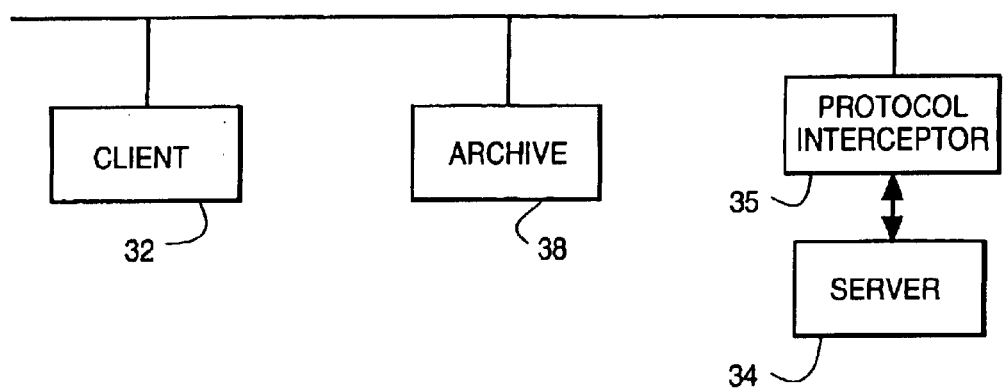
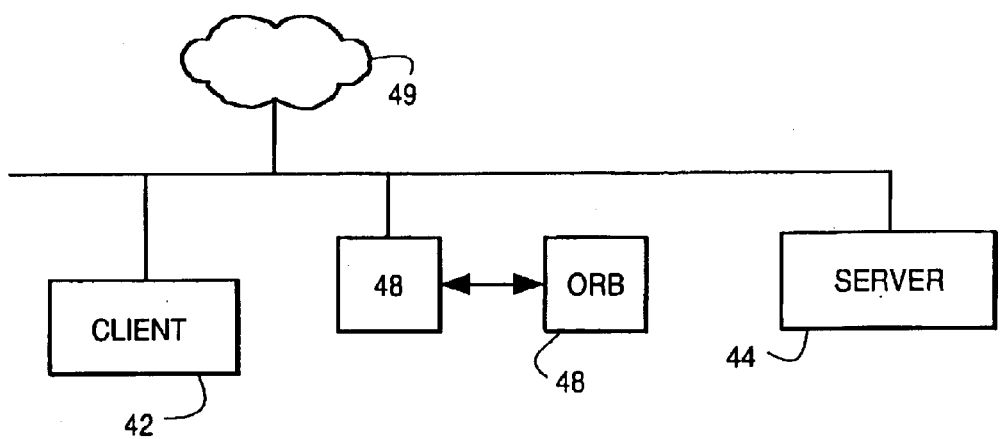

METHOD AND APPARATUS FOR DYNAMIC COMMAND EXTENSIBILITY IN AN INTELLIGENT AGENT

BACKGROUND OF THE INVENTION

The present invention relates to software system architecture, and in particular to a method of providing dynamic extensibility of software components, such as object classes.

In a traditional computing environment, executable components make requests of other executable components. In some instances, knowing which requests a component supports is built directly into all components that may make requests of it. In other cases, a component may provide the ability to answer queries about the requests that it supports. The latter case has the advantage of not requiring all potential clients to possess complete knowledge of the supported operations of all other components. This is well known and well understood technology.

Traditionally, when a component receives a request that it does not recognize, it responds by sending an error back to the calling component. This often results in the calling component cascading the error up the call chain until the application fails.

Systems such as Common Lisp, Small Talk, and Forth provide dynamic binding of software components. However, such systems perform such dynamic binding at installation or class definition time, before the components are actually required. Thus, a large resource footprint is required.

A Domain Name Server (DNS) has the ability to pass on a request to resolve a Domain Name to a more knowledgeable server. However, DNS's do not have the ability to upgrade their functionality if they receive a request in a format they cannot process, but simply pass a domain name on if it is not in the list it has stored.

The CORBA Dynamic Invocation Interface (DII) and Dynamic Skeleton Interface (DSI) allow the dynamic dispatch of requests on software components, so that changes to other components can be utilized at runtime; however, they do not cover the dynamic extensibility of executable content in a server component. The server component will return an error if it receives a request it cannot process.

STATEMENT OF INVENTION

The present invention provides a method and apparatus whereby a software component can dynamically update its supported requests, rather than sending an error when a request is not understood. From the calling component's perspective, the request appears to be filled in a standard manner and no error is returned. This has the significant benefit of reducing unnecessary application failure.

The present invention further provides a method and apparatus whereby, when a request from a client is not understood, a software component searches on further remote servers on which appropriate upgraded software components might be found, thereby to fulfill the request without returning an error.

BRIEF DESCRIPTION OF THE DRAWINGS

FIG. 1 shows apparatus arranged to implement the system of a first embodiment of the invention.

FIG. 2 is an interaction diagram illustrating the flow of control of an example the first embodiment.

FIG. 4 shows apparatus in accordance with a third embodiment of the invention.

FIG. 5 shows apparatus in accordance with a fourth embodiment of the invention.

DETAILED DESCRIPTION

Figure 3A:
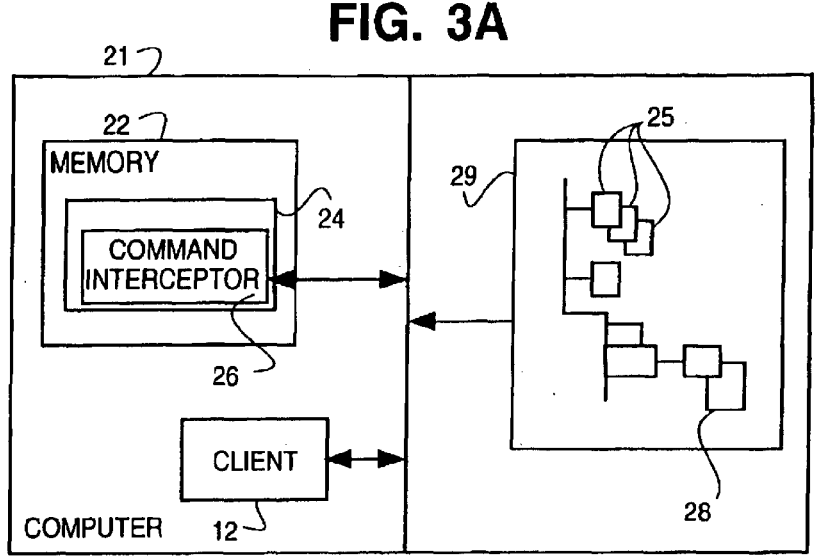
FIG. 3A shows apparatus in accordance with a second embodiment of the invention.

Several embodiments of the invention are described hereinafter with reference to FIGS. 1–5. These embodiments all operate in an environment where a request can be dynamically constructed by a client at run time and issued to a server for processing. This is in contrast to compiled-language systems, where requests are created statically at compile time, and usually are validated against a statically defined interface. Instead, it is assumed that a server may change its interface, and a client may change its requests, at any time and independent of each other. In this situation, clients must be prepared for servers to reject any request, even if it was previously processed successfully. Each embodiment adds a mechanism to locate and load implementations to handle client requests for previously unknown commands. This allows the successful completion of requests that would have otherwise failed.

A first embodiment of the invention is shown in FIGS. 1 and 2. This specific embodiment of the invention operates in an object based operating environment, although other embodiments of the invention might operate in other software environments in which a component can be acted upon by client components, for example using parameters, qualifiers or methods. Object based software environments are well known, and many software environments are based around an object model. In such environments, object classes are defined, each having a set of methods. A hierarchy of object classes will often be provided, with subclasses having all the methods and features of their parent classes, as well as further methods and features. Software components can generate object instances of defined classes which can be acted on independently. Many instances of the same object might exist at the same time, each acting independently. Objects which invoke methods on another object act as client objects, and objects having methods being invoked act as server objects. As shown in FIG. 1, objects 12, 14, 18 communicate with one another via an interface 20. The nature of the interface will vary depending on the architecture of the system. It might for example allow communication between objects across a network using appropriate protocols. A server request interceptor (SRI) 16 associated with each of the objects, intercepts requests made to the associated object as shown by a dotted line in FIG. 1.

FIG. 2 is a Unified Modeling Language (UML) interaction diagram describing the general design of the dynamic request apparatus and illustrates the flow of control with an example.

In the diagram shown in FIG. 2, client 12 makes a request called "foo( )" on the Server component 14. This request might include various parameters, which might be of different data types. Unknown to the Client, SRI 16 shown in FIG. 1 intercepts the request. It queries its list 162 of requests that it knows the Server component currently supports (referred to as a know( ) call). If "know(foo)" returns false, the Server Request Interceptor makes a request ("get(foo)") to a master Request Archive Server (RAS) 18 which contains executable components for all requests supported in the system. If the request has arguments which are incompatible with the requests, in this case foo( ), which the component can handle, a request is made to the Request Archive Server 18 to see if a new version of foo( ) exists which can handle the request. The Request Archive Server finds the executable component associated with foo( ) (if it exists) and sends it to the Server component 14 using the "hereis(foo)" call. The Request Archive Server also sends a success response to the get(foo) command to the Server Request Interceptor 16, and should also send a copy of the requests supported by the updated foo( ) on the server so that the Service Request Interceptor can add them to its list 162 of supported requests. The Server Request Interceptor 16 then invokes the foo( ) request on the Server component (knowing that the Server now supports foo( )) on behalf of the Client component 12 via the invoke(foo) call. After the invoke(foo) invocation returns, the Server Request Interceptor 16 returns any appropriate values to the Client component 12. From the Client's perspective, the dynamic retrieval of executable content is hidden. The Request Archive Server 18 need not be a single entity; it may be a distributed network of resources. It is presented as a singular entity in this example for simplicity only. For example, the server component might provide access to objects in dynamic link library files. Dynamic link library files provide functions that can be linked to a program at run-time, so that they don't waste memory when they are not being used. If a dynamic link library file is not available for linking to a program at run-time, or if the accessed dynamic link library file does not provide appropriate functionality to satisfy the request, a search is made for the dynamic link library file or an updated version thereof. A search might, for example, be made to find files on a server located at another location on a network Further embodiments of the invention, which operate in a similar manner to the embodiment of FIG. 1, and can incorporate the same components and architecture, are hereinafter provided with reference to FIGS. 3–5.

A second embodiment of the invention is implemented in a command shell environment, as shown in FIG. 3A. In a traditional command line shell 24 stored in memory 22 on a computer 21 (e.g.: the UNIX Bourne shell or COMMAND-.COM in MS-DOS), a request is composed by a client as a line of text, issued directly by a user, read from a script, or issued by an executable component on the system which might have spawned the shell instance. The shell command interpreter 26 in this instance acts as the server, and the typical request is execution of a program 25 stored in long term storage 29 optionally with command line parameters. The command interpreter has a certain vocabulary of requests that it understands. This vocabulary consists of a group of internally implemented commands, and externally available programs, usually stored in a designated group of directories. The vocabulary can be extended by adding external programs 25 to the appropriate directories. With command interpreters prior to the present invention, if a request does not correspond to an internal command or an external program 25, the command interpreter would respond with an error message indicating that the request could not be satisfied.

Figure 3B:
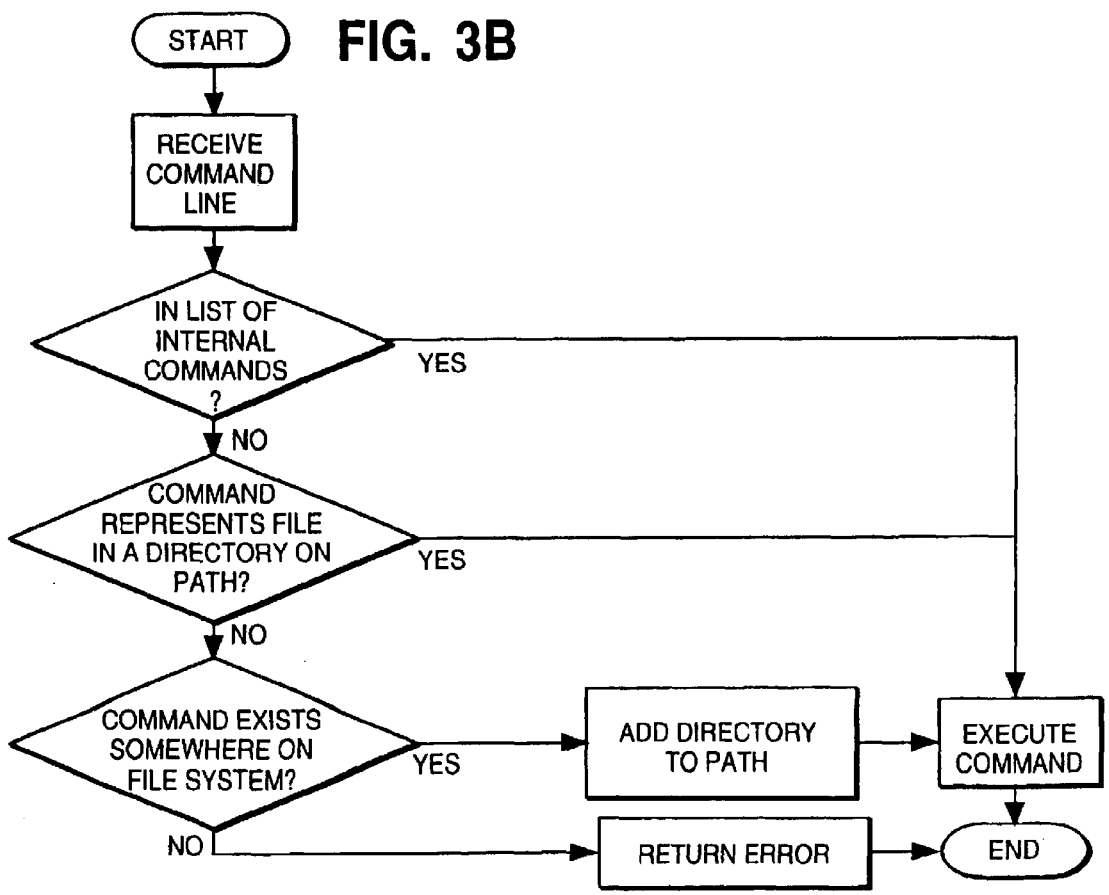
FIG. 3B shows the functionality of the apparatus shown in FIG. 3A.

As shown In FIG. 3B, according to this second embodiment of the invention, an extension mechanism would be provided that intercedes when a request is not part of the vocabulary of the command shell. The set of directories searched by the command shell, called the path, is viewed as a cache of available programs. When a request is made for a program that is not "in cache", the extension mechanism of this embodiment of the invention searches one or more network or archival sources 28, outside the scope of the command interpreter's search, to locate the program. If the program is located, it is brought "into cache" by copying the program into the path used by the command interpreter. Once the program is "cached", the original request can be reissued as if the program was there when the initial request was made.

With this mechanism in place, external policies can be defined to expire a command and remove it from the cache, expecting that it can be replaced later, if needed. One such policy might remove programs that have not been used recently. Another might compare version numbers and expire programs that are out of date relative to their reference source, or refresh them automatically when a newer version is available. These policies interact with, and depend on, the dynamic command extension mechanism, but are not part of the mechanism itself.

In a third embodiment of the invention, shown in FIG. 4, on the server side of a client/server system, a protocol interpreter reads requests, invokes server functions to process them, and returns results to the client. The vocabulary of the server is often defined by the protocol, and is implicitly understood by the client. The client prepares a request, transmits it to the server, and waits for a response. If the client requests an operation that is not understood by the server, the server responds with an appropriate error indicating that the request could not be satisfied. In some cases, this response indicates that the server and client are not using the same version of the protocol.

The third embodiment provides an extension mechanism that allows the client and server protocols to evolve independently along a backward compatible upgrade path. A client 32 creates a request for an operation based on the vocabulary it expects from a server 34 (the protocol). A protocol interpreter attempts to find a method (implementation of functionality) that corresponds to the requested operation. If the operation is part of the server's vocabulary, the corresponding method is invoked, and the results are returned, as usual. If the operation is not already part of the server's vocabulary, one or more network or archival sources 38 are searched to locate a method for this operation. If an appropriate method is found, it is loaded into the server's vocabulary, associated with this operation, and invoked as if it was present when the initial request was made. In this way servers may be dynamically extended to process requests made by upgraded clients, allowing clients and servers to evolve gracefully.

A fourth embodiment of the invention is shown in FIG. 5, and is implemented in a distributed system, such as CORBA. In such a system, clients 42 may dynamically construct operation requests for execution by a server object. In a CORBA based environment, the Dynamic Invocation Interface (DII) is used to effect this capability. The ORB maps the operation request to a method in an object implementation on the server side.

According to this embodiment, an extension mechanism provides just-in-time loading of object implementation methods to service client operation requests. If a client 42 requests an operation that is not available from a server object 44, the Object Request Broker invokes a searching component 48 external to the ORB to locate a suitable method implementation on a server 49 somewhere on the system. If such a method is found, it is associated with this operation and invoked in the normal way. Otherwise the operation fails as it normally would when an operation is not found.

To intercede in the ORB operation/method resolution mechanism, ORB vendor specific interfaces must be used. Many vendors provide interceptor mechanisms that would allow implementation of this dynamic extension technique.

The present invention could be implemented in a component based system architecture. In such an architecture, communities of loosely coupled services cooperate to provide system functionality. The number and nature of these services will vary greatly over time, as the system evolves. The flexibility of such an evolving system is enhanced by providing an extension mechanism that automatically tries to locate and obtain implementations of services when they are requested.

A client makes a local request for a connection to a specific service. The local service manager has a set of services that it knows about directly. If the service is already present, the connection is made and returned to the client. If the service is not present, a dynamic extension mechanism, which might be part of the Local Service Manager, or an independent component activated by the Local Service Manager, searches for an implementation of the requested service. If an implementation can be found, it is loaded by the service manager and the connection process proceeds as if the service were already present. Service versioning can be provided, if desired, by including some version information in the service identifier, effectively making the new version appear as a new and different service. Removal of old unused service implementations is an administrative issue beyond the scope of the dynamic extension mechanism.

While preferred embodiments of the present invention have been illustrated and described, it will be understood by those of ordinary skill in the art that changes and modifications can be made without departure from the invention in its broader aspects. Various features of the present invention are set forth in the following claims.

What is claimed is:

1. A computer system, comprising:
   a client component;
   a server component comprising a dynamic link library, said client component arranged to make requests to said server component during execution of said client component;
   a request archive component, maintaining a representation of requests which can be satisfied by said server component; and
   a request intercepting component, arranged to intercept requests from said client component to said server component, and to determine from said representation whether a request is supported by said server component;
   such that said request intercepting component is arranged to search external sources to locate and provide to said server component an executable implementation of functionality required for said server component to support said request when said request is not currently supported;
   such that said request intercepting component thereafter invokes said request on said server component in a manner hidden from said client component;
   such that said server component comprises an object represented in said dynamic link library file in at least one computer program;
   such that said request intercepting component searches for said dynamic link library file, or an updated version of said dynamic link library file if a current version of said dynamic link library file held on said computer system does not provide the functionality of said server component.

2. A computer system, comprising:
   a client component;
   a server component comprising a dynamic link library, said client component arranged to make requests to said server component during execution of said client component;
   a request archive component, including a representation of requests which can be satisfied by said server component; and
   a request intercepting component, intercepting requests from said client component to said server component, and determining from said representation if a request is supported by said server component; said request intercepting component being arranged to search external sources to locate and provide to said server component an executable implementation of functionality required for said server component to support said request if said request is not currently supported; and for thereafter invoking said request on said server component in a manner hidden from said client component;
   such that said server component comprises an object represented in said dynamic link library file in at least one computer program;
   such that said request intercepting component searches for said dynamic link library file, or an updated version of said dynamic link library file if a current version of said dynamic link library file held on said computer system does not provide the functionality of said server component.

3. A computer system comprising:
   a client component comprising a software program;
   a server component comprising an operating system shell called by said software program, such that said client component is arranged to make requests to said server component during execution of said client component;
   a request archive component for maintaining a representation of requests which can be satisfied by said server component; and
   a request intercepting component comprising a command interpreter, arranged to intercept requests from said client component to said server component, and to determine from said representation whether a request is supported by said server component;
   such that said request intercepting component is arranged to search external sources to locate and provide to said server component an executable implementation of functionality required for said server component to support said request when said request is not currently supported;
   said request intercepting component thereafter invoking said request on said server component in a manner hidden from said client component;
   such that said server component comprises an object represented in said operating system shell called by said software program;
   such that said request intercepting component searches for said operating system shell, or an updated version of said operating system shell if a current version of said operating system shell held on said computer system does not provide the functionality of said server component.

4. A computer system comprising:

a client component, comprising a software program;

a server component, comprising an operating system shell called by said software program, such that said client component is arranged to make request to said server component during execution of said client component;

a request archive component maintaining a representation of requests which can be satisfied by said server component; and a request intercepting component, for intercepting requests from said client component to said server component, and for determining from said representation whether a request is supported by said server component; said intercepting means comprising a command interpreter and being arranged to search external sources to locate and provide to said server component an executable implementation of functionality required for said server component to support said request when said request is not currently supported; and for thereafter invoking said request on said server component in a manner hidden from said client component;

such that said server component comprises an object represented in said operating system shell called by said software program;

such that said request intercepting component searches for said operating system shell, or an updated version of said operating system shell if a current version of said operating system shell held on said computer system does not provide the functionality of said server component.

5. A CORBA distributed computer system comprising:

a client component, said client component being an object of said CORBA distributed computer system;

a server component, said server component being an object of said CORBA distributed computer system, such that said client component is arranged to make requests to said server component during execution of said client component;

a request archive component, maintaining a representation of requests which can be satisfied by said server component; and a request intercepting component, comprising an object request broker arranged to intercept requests from said client component to said server component, and to determine from said representation whether a request is supported by said server component;

such that said request intercepting component is arranged to search external sources to locate and provide to said server component an executable implementation of functionality required for said server component to support said request when said request is not currently supported;

said request intercepting component thereafter invoking said request on said server component in a manner hidden from said client component;

such that said server component is an object of said CORBA distributed computer system;

such that said request intercepting component is invoked by the object request broker to search for said object of said CORBA distributed computer system or an updated version of said object of said CORBA distributed computer system if a current version of said CORBA distributed computer system does not provide the functionality of said server component.

6. A CORBA distributed computer system comprising:

a client component, said client component being an object of the CORBA distributed computer system;

a server component, said server component being an object of the CORBA distributed computer system, such that said client component is arranged to make request to said server component during execution of said client component;

a request archive component, maintaining a representation of requests which can be satisfied by said server component; and a request intercepting component, intercepting requests from said client component to said server component, and for determining from said representation whether a request is supported by said server component; said request intercepting component comprising a command interpreter and being arranged to search external sources to locate and provide to said server component an executable implementation of functionality required for said server component to support said request when said request is not currently supported; and for thereafter invoking said request on said server component in a manner hidden from said client component;

such that said server component is an object of said CORBA distributed computer system;

such that said request intercepting component is invoked by the object request broker to search for said object of said CORBA distributed computer system, or an updated version of said object of said CORBA distributed computer system if a current version of said CORBA distributed computer system does not provide the functionality of said server component.

7. A computer system comprising:

a client component;

a server component, comprising a protocol interpreter, such that said client component is arranged to make requests to said server component during execution of said client component;

a request archive component, maintaining a representation of requests which can be satisfied by said server component; and a request intercepting component, arranged to intercept requests from said client component to said server component, and to determine from said representation whether a request is supported by said protocol interpreter of said server component;

such that said request intercepting component is arranged to search external sources to locate and provide to said server component an executable implementation of functionality required for said server component to support said request when said request is not currently supported;

such that said request intercepting component thereafter invokes said request on said server component in a manner hidden from said client components;

such that said server component comprises a protocol interpreter arranged to make request based on an expected vocabulary of the server component;

such that said request intercepting component searches for said request, or loads the request into the vocabulary of the server component by said protocol interpreter if a current version of said request does not provide the functionality of said server component.

8. A computer system comprising:

a client component;

a server component, comprising a protocol interpreter, such that said client component is arranged to make request to said server component during execution of said client component;

a request archive component, maintaining a representation of requests which can be satisfied by said server component; and a request intercepting component, intercepting requests from said client component to said server component, and determining from said representation whether a request is supported by said protocol interpreter of said server component; said request intercepting component being arranged to search external sources to locate and provide to said server component an executable implementation of functionality required for said server component to support said request when said request is not currently supported; and for thereafter invoking said request on said server component in a manner hidden from said client component;

such that said server component comprises a protocol interpreter arranged to make request based on an expected vocabulary of the server component, such that said request intercepting component searches for said request or loads the request into the vocabulary of the server component by said protocol interpreter if a current version of said request does not provide the functionality of said server component.

9. A component based computer system comprising:

a client component;

a server component comprising a local service manager, such that said client component is arranged to make requests to said server component during execution of said client component;

an archive request component for maintaining a representation of requests which can be satisfied by said server component; and a request intercepting component, arranged to intercept requests from said client component to said server component, and to determine from said representation whether a request is supported by said local service manager of said server component;

such that said request intercepting component is arranged to search external sources to locate and provide to said server component an executable implementation of functionality required for said server component to support said request when said request is not currently supported;

such that said request intercepting component thereafter invokes said request on said server component in a manner hidden from said client components;

such that said server component comprising a local service manager comprises a set of services known to be present on the server component;

such that said request intercepting component uses the local service manager to search for an implementation of the requested service, or an updated version of the requested service if a current version of the requested service held on said computer system does not provide the requested functionality of said server component.

10. A component based computer system comprising:

a client component;

a server component, comprising a local service manager, such that said client component is arranged to make request to said server component during execution of said client component;

an archive request component, maintaining a representation of requests which can be satisfied by said server component; and a request intercepting component, intercepting requests from said client component to said server component, and determining from said representation whether a request is supported by said local service manager of said server component; said request intercepting component being arranged to search external sources to locate and provide to said server component an executable implementation of functionality required for said server component to support said request when said request is not currently supported; and for thereafter invoking said request on said server component in a manner hidden from said client component;

such that said server component comprising a local service manager comprises a set of services known to be present on the server component;

such that said request intercepting component uses the local service manager to search for an implementation of the requested service, or an updated version of the requested service if a current version of the requested service held on said computer system does not provide the requested functionality of said server component.

* * * * *